(12) United States Patent
Chou

(10) Patent No.: US 7,990,264 B2
(45) Date of Patent: Aug. 2, 2011

(54) SYSTEM AND METHOD FOR ACQUIRING LOCATION INFORMATION OF A COMMUNICATION DEVICE

(75) Inventor: Chien-Lung Chou, Tu-Cheng (TW)

(73) Assignee: Chi Mei Communication Systems, Inc., Tu-Cheng, New Taipei (TW)

( * ) Notice: Subject to any disclaimer, the term of this patent is extended or adjusted under 35 U.S.C. 154(b) by 388 days.

(21) Appl. No.: 12/253,933

(22) Filed: Oct. 17, 2008

(65) Prior Publication Data

US 2009/0284371 A1 Nov. 19, 2009

(30) Foreign Application Priority Data

May 16, 2008 (CN) .......................... 2008 1 0301603

(51) Int. Cl.
*G08B 1/08* (2006.01)
*H04M 11/04* (2006.01)
*H04W 24/00* (2009.01)
*G08B 5/22* (2006.01)

(52) U.S. Cl. ......... 340/539.13; 340/539.11; 340/995.12; 340/8.1; 455/404.2; 455/414.3; 455/456.1; 455/456.2; 701/213; 342/450

(58) Field of Classification Search .............. 340/539.13
See application file for complete search history.

(56) References Cited

U.S. PATENT DOCUMENTS

| 7,010,583 | B1 * | 3/2006 | Aizono et al. | 709/219 |
|---|---|---|---|---|
| 2004/0092269 | A1 * | 5/2004 | Kivinen | 455/456.1 |
| 2009/0284371 | A1 * | 11/2009 | Chou | 340/539.13 |
| 2009/0324025 | A1 * | 12/2009 | Camp et al. | 382/124 |
| 2010/0059587 | A1 * | 3/2010 | Miller et al. | 235/379 |
| 2010/0303560 | A1 * | 12/2010 | Guenther | 406/184 |

* cited by examiner

*Primary Examiner* — Donnie Crosland
(74) *Attorney, Agent, or Firm* — Frank R. Niranjan

(57) ABSTRACT

A method for acquiring location information of a communication device is disclosed. The method acquires the location information of a first communication device according to a request received from a second communication device, and then transmitting the location information of the first communication device to the second communication device A system for acquiring location information of a communication device is also provided. By utilizing the method and the system, another people may find a location of a user of the first communication device.

12 Claims, 2 Drawing Sheets

SYSTEM AND METHOD FOR ACQUIRING LOCATION INFORMATION OF A COMMUNICATION DEVICE

BACKGROUND

1. Field of the Invention

Embodiments of the present disclosure relate to location systems and methods, and more particularly to a system and method for acquiring location information of a communication device.

2. Description of Related Art

It is useful to find location of people or an object for different reasons. The location in-and-of itself is important because it allows another people to find something that is lost, such as a child or a piece of expensive equipment. The location also allows courier companies to arrange deliveries logically and efficiently. With the development of auxiliary functions of a communication device (e.g. a mobile phone), more and more communication devices are installed with global position systems (GPSs) for locating the communication devices.

However, if a person wants to find the user of the communication device, the person has to wait for the user to send corresponding location information.

What is needed, therefore, is an improved system and method for acquiring location information of a communication device to overcome the above-stated problems and facilitate to acquire the location information of the communication device.

SUMMARY

A system for acquiring location information of a communication device is provided. The system includes a setting module, a receiving module, a comparing module, an activating module, an acquiring module, and a sending module. The setting module is configured for setting a character string in a first communication device. The receiving module is configured for receiving a short message from a second communication device. The comparing module is configured for comparing textual data of the received short message with the character string, and determining if the textual data of the received short message is substantially the same as the character string. The activating module is configured for activating a global position system (GPS) of the first communication device to locate a position of the first communication device if the textual data of the received short message is substantially the same as the character string The acquiring module is configured for acquiring location information of the first communication device from the GPS. The sending module is configured for sending the location information to the second communication device.

Other advantages and novel features of the present disclosure will be drawn from the following detailed description of certain inventive embodiments of the present disclosure with reference to the attached drawings.

DETAILED DESCRIPTION OF CERTAIN INVENTIVE EMBODIMENTS

All of the processes described below may be embodied in, and fully automated via, software code modules executed by one or more general purpose computers or processors. The code modules may be stored in any type of computer-readable medium or other storage device. Some or all of the methods may alternatively be embodied in specialized computer hardware or communication apparatus.

Figure 1:
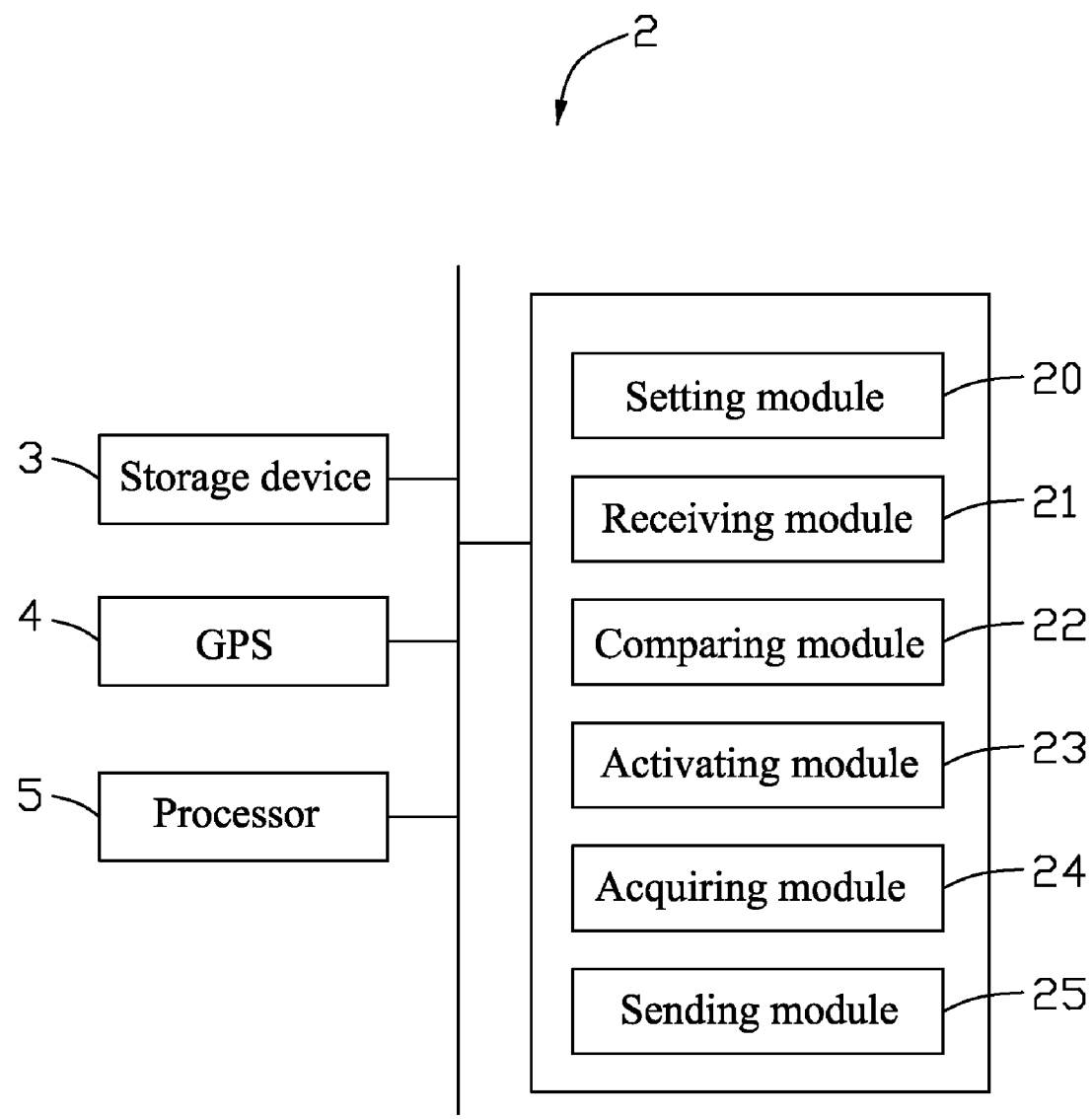
FIG. 1 is a block diagram of one embodiment of a system for acquiring location information of a communication device.

FIG. 1 is a block diagram of one embodiment of a system 2 for acquiring location information of a communication device (hereinafter referred to as "the locating system 2"). Depending on the embodiment, the locating system 2 may be any kind of communication devices (e.g., mobile phone), for example. To better detail the embodiment, a communication device, which is initiated to tracking a location of a predetermined communication device, will be described as a second communication device, and the predetermined communication device will be described as a first communication device. The locating system 2 is configured for acquiring current location information of the first communication device according to a request received from the second communication device, and then transmitting the current location information to the second communication device.

The locating system 2 includes a storage device 3, a global position system (GPS) 4, and at least one processor 5. The storage device 3 is used for storing various kinds of data, such as short messages received by the first communication device and the location information of the first communication device, etc. Depending on the embodiment, the storage device 3 may include a memory of the locating system 2 or an external storing card, such as a memory stick, a Subscriber Identity Module (SIM) card, for example. The GPS 4 is used for locating the communication device and acquiring the location information of the communication device.

In one embodiment, the locating system 2 may include a setting module 20, a receiving module 21, a comparing module 22, an activating module 23, an acquiring module 24, and a sending module 25. The modules 20-25 may be used to perform one or more operations for the locating system 2. In another embodiment, the locating system 2 may include one or more specialized or general purpose processors, such as the at least one processor 2 for executing at least one operation for the modules 20-25.

The setting module 20 is configured for setting a character string in the communication device, and storing the character string in the storage device 3 of the locating system 2. The character string may be composed of various kinds of characters, such as alphanumerical characters, symbols and/or other kinds of characters. In the embodiment of the present disclosure, the character string may be preset as a key for activating the GPS 4 to locate a position of the first communication device.

The receiving module 21 is configured for receiving a short message from the second communication device.

The comparing module 22 is configured for comparing textual data of the received short message with the character string stored in the storage device 3, and determining if the textual data of the received short message is substantially the same as the character string. In addition, the receiving module 21 prompts that the first communication device has received a new short message if the textual data of the received short message is different from the character string.

The activating module 23 is configured for activating the GPS 4 to locate a position of the first communication device if the textual data of the received short message is substantially the same as the character string.

The acquiring module 24 is configured for acquiring location information of the first communication device from the GPS 4.

The sending module 25 is configured for sending the location information to the second communication device, so as to inform the location of the first communication device to a user of the second communication device.

The location information may include various kinds of data, such as longitude, latitude, altitude, an electronic map, and so on. The first communication device may store the electronic map in the storage device 3, when the acquiring module 24 acquires the location information of the first communication device from the GPS 4. The acquiring module 24 may further mark the location of the first communication device on the electronic map according to the location information of the longitude, the latitude, and the altitude, and then the sending module 25 inputs the marked electronic map in a multimedia messaging service (MMS) message, and sends the MMS message to the second communication device.

Figure 2:
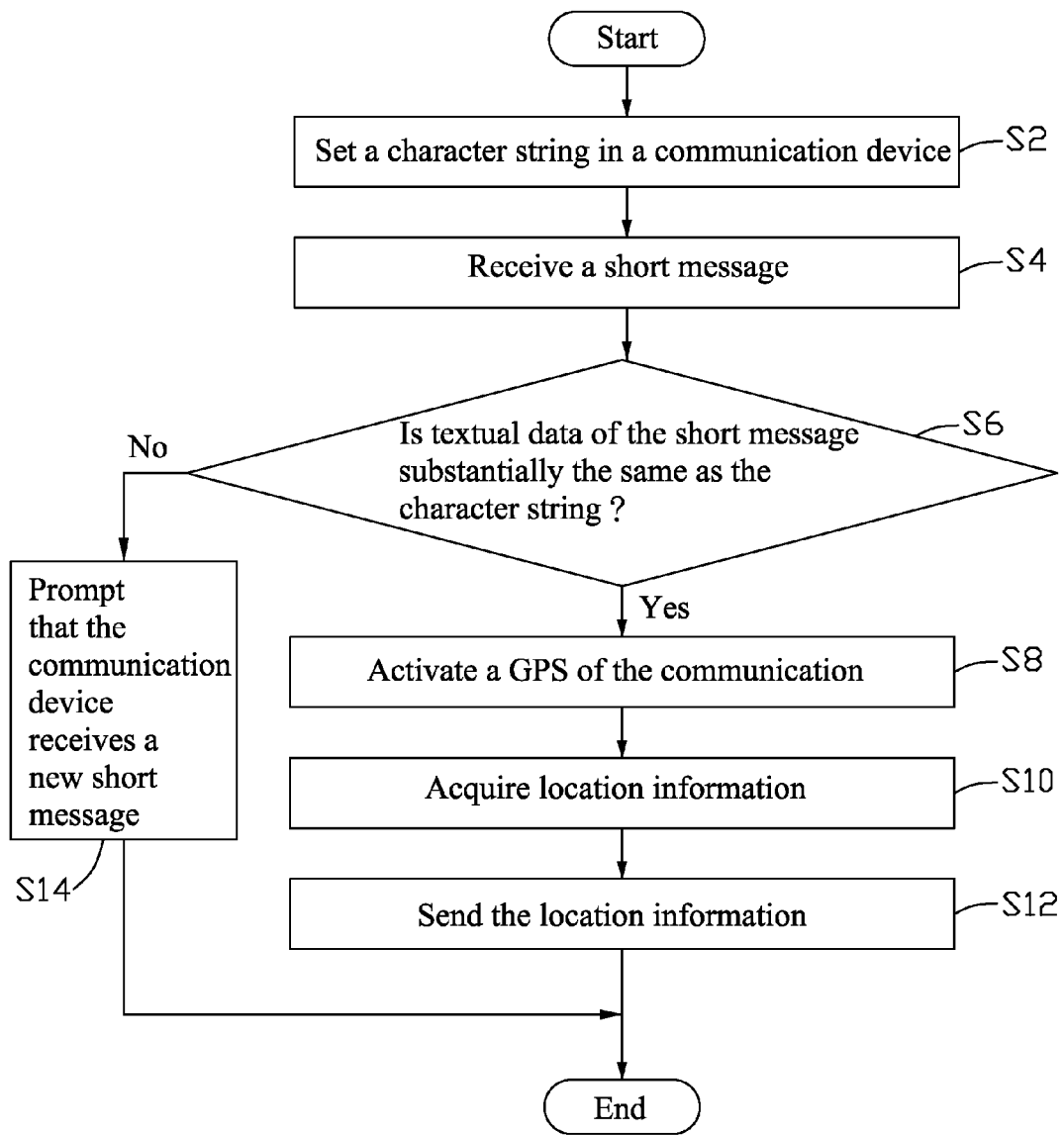
FIG. 2 is a flowchart of one embodiment of a method for acquiring location information of the communication device.

FIG. 2 is a flowchart of one embodiment of a method for acquiring the location information of the communication device. Depending on the embodiment, additional blocks may be added, others removed, and the ordering of the blocks may be changed.

In block S2, the setting module 20 sets a character string in a first communication device, and stores the character string in the storage device 3 of the communication device. The character string may be composed of various kinds of characters, such as alphanumerical characters, symbols and/or other kinds of characters. In the embodiment of the present disclosure, the character string may be preset as a key for activating the GPS 4 to locate a position of the first communication device.

In block S4, the receiving module 21 receives a short message from a second communication device.

In block S6, the comparing module 22 compares textual data of the received short message with the character string, and determining if the textual data of the received short message is substantially the same as the character string. If the textual data of the received short message is substantially the same as the character string, in block S8, the activating module 23 activates the GPS 4 to locate a position of the first communication device. Otherwise, if the textual data of the received short message is different from the character string, in block S14, the receiving module 21 prompts that the first communication device has received a new short message.

In block S10, the acquiring module 24 acquires location information of the first communication device from the GPS 4. In block S12, the sending module 25 sends the location information to the second communication device, so as to inform the location of the first communication device to a user of the second communication device.

If the GPS 4 has been activated before executing block S8, the procedure may goes to block S10 directly without executing block S8.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A computing system for acquiring location information of a communication device, the computing system comprising:

a setting module configured for setting a character string in a first communication device;

a receiving module configured for receiving a short message from a second communication device;

a comparing module configured for comparing textual data of the received short message with the character string, and determining if the textual data of the received short message is substantially the same as the character string;

an activating module configured for activating a global position system (GPS) of the first communication device to locate a position of the first communication device if the textual data of the received short message is substantially the same as the character string;

an acquiring module configured for acquiring location information of the first communication device from the GPS, or marking a location of the first communication device on an electronic map according to the location information;

a sending module configured for sending the location information to the second communication device, or inputting the marked electronic map in a multimedia messaging service (MMS) message, and sending the MMS message to the second communication device; and at least one processor for executing the setting module, the receiving module, the comparing module, the activating module, the acquiring module, and the sending module.

2. The system according to claim 1, wherein the character string is composed of alphanumerical characters and/or symbols.

3. The system according to claim 1, wherein the character string is preset as a key for activating the GPS to locate the position of the first communication device.

4. The system according to claim 1, wherein the receiving module is further configured for prompting that the first communication device has received a new short message if the textual data of the received short message is different from the character string.

5. A method for acquiring location information of a communication device, the method comprising:

setting a character string in a first communication device;

receiving a short message from a second communication device;

comparing textual data of the received short message with the character string, and determining if the textual data of the received short message is substantially the same as the character string;

activating a global position system (GPS) of the first communication device to locate a position of the first communication device if the textual data of the received short message is substantially the same as the character string;

acquiring location information of the first communication device from the GPS, or marking a location of the first communication device on an electronic map according to the location information; and sending the location information to the second communication device, or inputting the marked electronic map in a multimedia messaging service (MMS) message, and sending the MMS message to the second communication device.

6. The method according to claim 5, further comprising:

prompting that the first communication device has received a new short message if the textual data of the received short message is different from the character string.

7. The method according to claim 5, wherein the character string is composed of alphanumerical characters and/or symbols.

8. The method according to claim 5, wherein the character string is preset as a key for activating the GPS to locate the position of the first communication device.

9. A storage device medium having stored thereon instructions that, when executed by a processor, causing the processor to perform a method for acquiring location information of a communication device, the method comprising:
   setting a character string in a first communication device;
   receiving a short message from a second communication device;
   comparing textual data of the received short message with the character string, and determining if the textual data of the received short message is substantially the same as the character string;
   activating a global position system (GPS) of the first communication device to locate a position of the first communication device if the textual data of the received short message is substantially the same as the character string;
   acquiring location information of the first communication device from the GPS, or marking a location of the first communication device on an electronic map according to the location information; and
   sending the location information to the second communication device, or inputting the marked electronic map in a multimedia messaging service (MMS) message, and sending the MMS message to the second communication device.

10. The medium according to claim 9, the method further comprises:
    prompting that the first communication device has received a new short message if the textual data of the received short message is different from the character string.

11. The medium according to claim 9, wherein the character string is composed of alphanumerical characters and/or symbols.

12. The medium according to claim 9, wherein the character string is preset as a key for activating the GPS to locate the position of the first communication device.

* * * * *